United States Patent [19]
Katz et al.

[11] 3,959,657
[45] May 25, 1976

[54] FILM IDENTIFICATION APPARATUS

[75] Inventors: Seymour Katz, Glen Cove; Victor R. Brown, West Hempstead, both of N.Y.

[73] Assignee: IPCO Hospital Supply Corporation, White Plains, N.Y.

[22] Filed: Apr. 7, 1975

[21] Appl. No.: 565,583

[52] U.S. Cl................................ 250/476; 250/475
[51] Int. Cl.²....................................... G03B 41/16
[58] Field of Search ............ 250/475, 476, 482, 323

[56] References Cited
UNITED STATES PATENTS

| | | | |
|---|---|---|---|
| 3,488,753 | 1/1970 | Tone et al. | 250/476 |
| 3,649,832 | 3/1972 | Lentz | 250/475 |
| 3,683,182 | 8/1972 | Farmer | 250/476 |
| 3,845,314 | 10/1974 | Byler et al. | 250/476 |

Primary Examiner—Archie R. Borchelt
Assistant Examiner—B. C. Anderson
Attorney, Agent, or Firm—Lee C. Robinson, Jr.

[57] ABSTRACT

Apparatus for placing identifying indicia on x-ray film within a cassette, in which an electroluminescent panel is provided with a resiliently biased slide element movably mounted on a cassette supporting member. As the cassette is positioned on the supporting member, a portion of the panel protrudes into a slot-shaped opening in one edge of the cassette, and the cassette edge simultaneously urges the slide element away from the protruding portion such that only the protruding portion and an indicia bearing card extend into the opening. When the cassette reaches its proper position on the support member, an electrical circuit automatically closes for a predetermined period of time to illuminate the panel and thereby expose the film with the information on the card.

12 Claims, 8 Drawing Figures

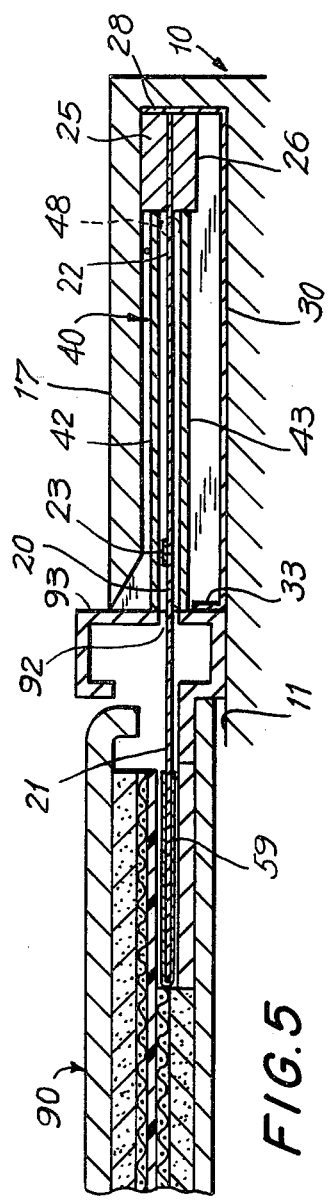
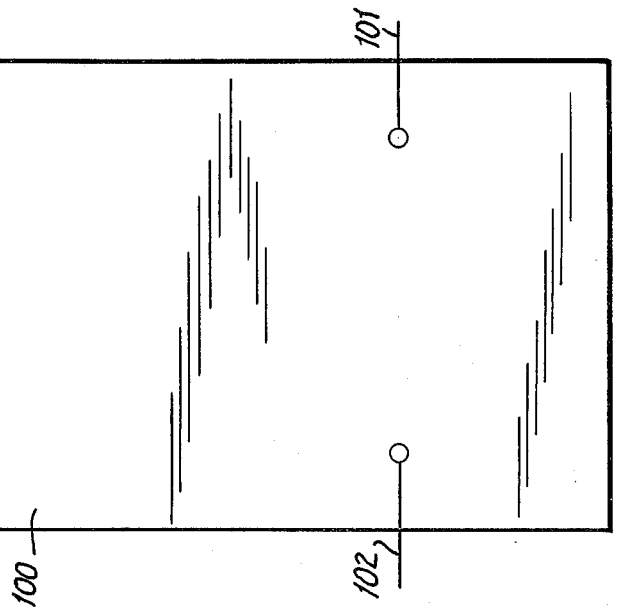
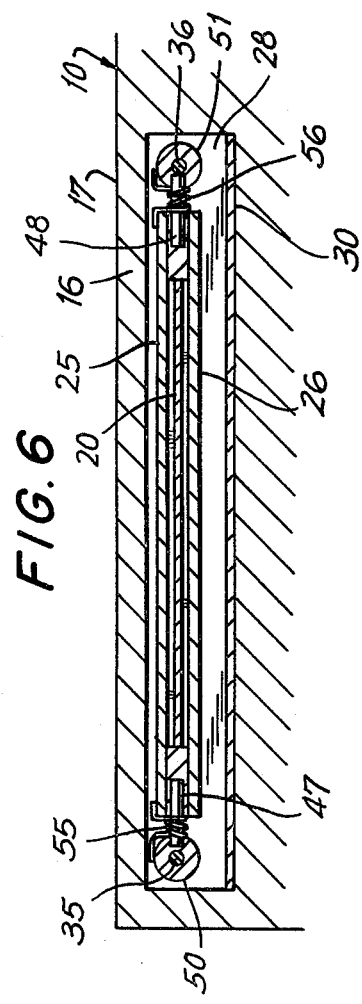
FIG. 5
FIG. 7
FIG. 6

1

FILM IDENTIFICATION APPARATUS

BACKGROUND OF THE INVENTION

This invention relates to film identification apparatus and more particularly to such apparatus for placing identifying indicia on photographic film.

The present invention, while of general application, is particularly well suited for applying identifying indicia to x-ray or other radiographic film. In many modern hospitals, for example, the problem of accurately correlating the identity of a patient with a particular x-ray photograph has become increasingly acute. Some of the early attempts to resolve this problem entailed the use of lead letters or symbols which were arrayed against the face of an x-ray cassette adjacent one of its edges. The film was then exposed either by the same x-ray machine used to photograph the patient or with a different x-ray machine. With the increasingly large number of x-rays taken in a given hospital, however, the task of assembling the individual letters or symbols to provide such patient identification became correspondingly burdensome and expensive, and the procedures used for accomplishing this were subject to many opportunities for both human and mechanical error.

More recently, attempts to resolve the film identification problem made use of typed cards on an electroluminescent panel. The panel and card assembly was inserted in a corresponding opening in one edge of the cassette such that, upon the illumination of the panel, the information on the card was reproduced on the film.

Film identification apparatus of the foregoing type have exhibited several disadvantages. As an illustration, several of the apparatus previously employed used an electroluminescent panel which, to provide the desired illumination, needed to be too thin to have sufficient structural rigidity to withstand repeated insertion and withdrawal in the openings of successive cassettes. In an effort to alleviate this problem, certain types of such prior apparatus enclosed the panel within a rigid tongue member which was inserted into the opening in the cassette together with the typed card and the panel itself. However, such a tongue member not only required an unnecessarily large opening, but it also was not suitable for use with many of the thinner types of cassettes. In addition, the comparatively massive tongue member frequently interfered with the legibility of the indicia formed on the film and had other disadvantages.

SUMMARY

One general object of this invention, therefore, is to provide new and improved apparatus for placing identifying indicia on photographic film.

More specifically, it is an object of this invention to provide such film identification apparatus having an illuminating panel which is adequately supported and yet does not require the insertion into the cassette of anything other than the panel itself and an identifying card.

Another object of the invention is to provide film identification apparatus of the character indicated in which the insertion of the illuminating panel is greatly facilitated.

A further object of the invention is to provide film identification apparatus in which the panel is automatically illuminated for a predetermined exposure period as soon as it is properly located within the cassette.

Still another object of the invention is to provide film identification apparatus which is economical to manufacture and thoroughly reliable in operation.

In one illustrative embodiment of the invention, the apparatus includes a cassette supporting member having a suitable guide element for receiving an x-ray cassette. An electroluminescent panel is mounted on the supporting member, and a typed card or other appropriate indicia means is removably disposed on a protruding tab portion of the panel. When the panel and card assembly are properly located within an edge opening in the cassette, the panel is illuminated to thereby expose the film with the information on the card.

In accordance with one feature of the invention, the apparatus is provided with a novel slide mechanism which is movably mounted on the cassette supporting member in position to protect the protruding tab portion of the panel or other illumination means. The slide mechanism is engaged by one of the edges of the cassette and is urged thereby away from protecting relationship with the tab portion as the cassette is received by the supporting member, such that only the tab portion and the indicia means extend within the cassette opening. The arrangement is such that the illumination means is fully protected at all times, and yet there is no necessity for inserting the protecting structure into the cassette itself.

In accordance with another feature of the invention, in certain particularly important embodiments, the protruding portion of the illumination means is pivotally movable relative to the remaining portion. The protruding portion may be readily swung into a position in which the indicia means is quickly and easily applied thereto, and it then automatically returns to its initial position in condition for insertion into the cassette.

In accordance with an additional feature of several advantageous embodiments of the invention, there is provided an electrical circuit which is automatically responsive to the receipt of a cassette by the supporting member for energizing the illumination means. After a predetermined time interval, the circuit automatically deenergizes the illumination means, and the cassette is then withdrawn from the supporting member with the film properly exposed with the information on the indicia means.

The present invention, as well as further objects and features thereof, will be understood more clearly and fully from the following description of certain preferred embodiments, when read with reference to the accompanying drawings.

BRIEF DESCRIPTION OF THE DRAWINGS

FIG. 5 is a fragmentary sectional view similar to FIG. 3 but showing certain portions of the apparatus in different positions.

FIG. 6 is a fragmentary sectional view taken along the line 6—6 in FIG. 4.

FIG. 7 is a top plan view of an electroluminescent panel useful in connection with the apparatus.

DESCRIPTION OF CERTAIN PREFERRED EMBODIMENTS

Figure 1:
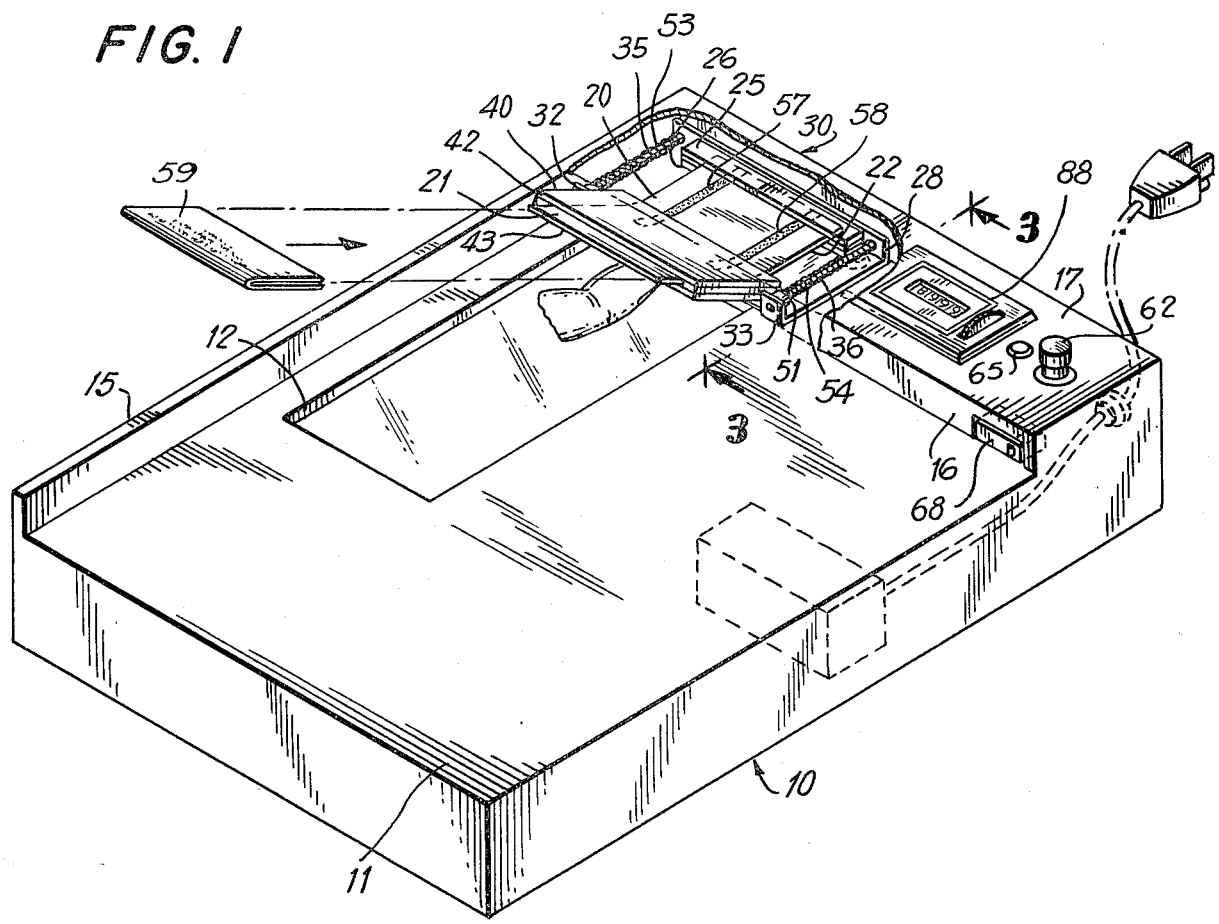
FIG. 1 is a perspective view of film identifying apparatus in accordance with one illustrative embodiment of the invention.

Referring to FIG. 1 of the drawings, there is shown a film identification apparatus which includes a box-like support member indicated generally at 10. The support member 10 is provided with a flat horizontal surface 11 of a size sufficient to accommodate an x-ray film cassette (not shown in FIG. 1). This surface contains a rectangular access opening 12, and a guide flange 15 extends upwardly from one of the side edges of the surface in order to properly locate the cassette thereon. An upstanding abutment flange 16 extends along the rear edge of the surface 11 and serves as a stop for the cassette. The flange 16 forms a portion of a ledge 17 which is located a short distance above the plane of the surface 11 and encloses the various electrical components of the apparatus.

Figure 4:
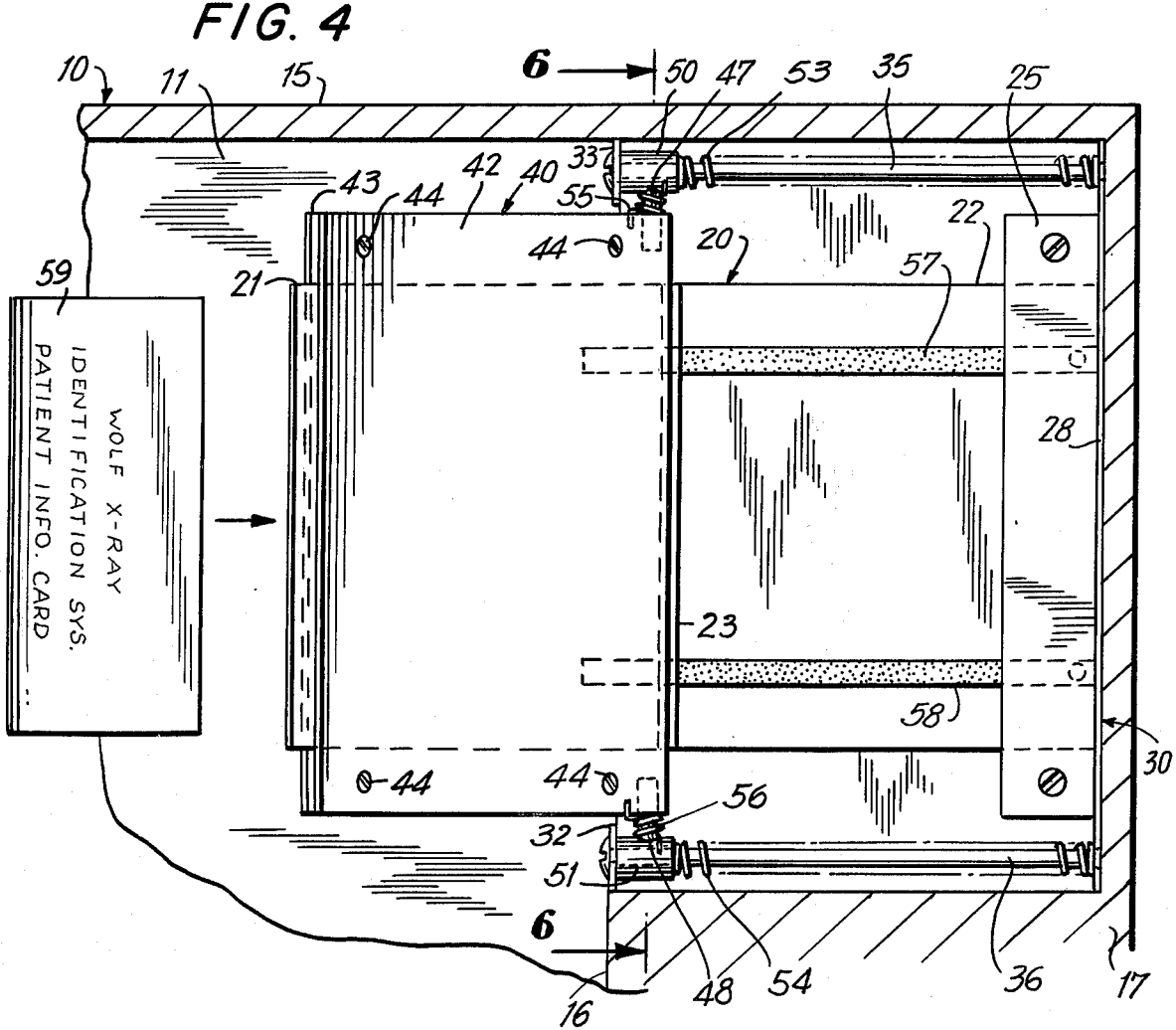
FIG. 4 is a fragmentary sectional view taken generally along the line 4—4 in FIG. 3.

An electroluminescent panel 20 is carried by the support member 10 adjacent the ledge 17. The panel 20 is of flat rectangular configuration and may be of several commercially available types which are electrically energized to emit light of sufficient intensity to expose x-ray film. The panel 20 is provided with a protruding tab portion 21 and a stationary rear portion 22 which are interconnected by a flap-type hinge 23 (FIG. 4). The tab portion 21 extends over the cassette receiving surface 11, while the rear portion 22 is rigidly affixed to the support member 10 by a pair of clamping plates 25 and 26.

Figure 3:
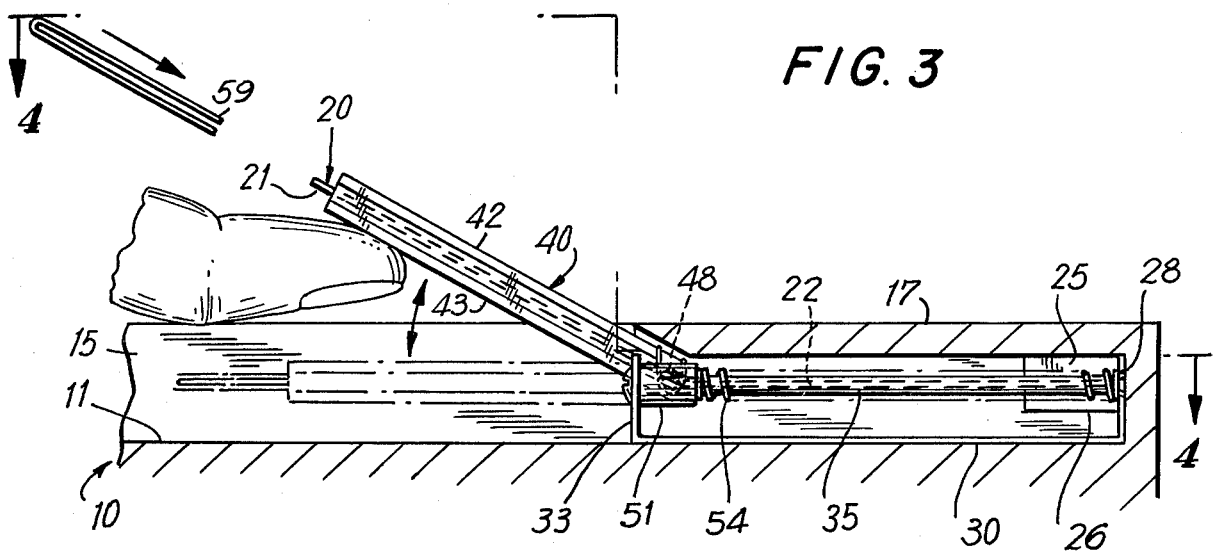
FIG. 3 is a fragmentary sectional view taken along the line 3—3 in FIG. 1.

As best shown in FIG. 3, the clamping plates 25 and 26 are welded or otherwise secured to an upstanding flange 28 on a mounting bracket 30. The bracket 30 serves as a support for the electroluminescent panel 20 and is permanently affixed within the ledge portion 17 of the support member 1o. The flange 28 extends along the rear edge of the bracket 30, while the forward edge includes a pair of upstanding ears 32 and 33 such that the bracket exhibits a generally channel-shaped cross-section. The ears 32 and 33 respectively support the forward ends of guide rods 35 and 36, the rear ends of these rods being affixed to the flange 28.

A slide member 40 is movably carried by the guide rods 35 and 36. The slide member 40 comprises an upper plate 42 and a lower plate 43 which are spaced apart adjacent the opposite surfaces of the electroluminescent panel 20 and are held in position by suitable machines screws 44. Two pivot pins 47 and 48 protrude outwardly from adjacent the rearward corners of the slide member 40. These pins are respectively carried by collars 50 and 51 which extend around the guide rods 35 and 36 in slidable relationship therewith. The collars 50 and 51, and hence the slide member 40, are resiliently biased in their forward positions by coil springs 53 and 54 around the rods 35 and 36.

The arrangement is such that the assembly comprising the slide member 40, the pivot pins 47 and 48 and the collars 50 and 51 is slidably movable from its forward position (the position shown in FIGS. 3 and 4) to its rearward position (the position shower in FIG. 5) against the resilient biasing force of the springs 53 and 54. In addition, the member 40, together with the tab portion 21 of the electroluminescent panel 20, may be pivoted in an upward direction about the axes of the pins 47 and 48. This pivotal movement is resisted by suitable biasing springs 55 and 56 which serve to normally maintain the member 40 and the tab portion 21 in substantially coplanar relationship with the rear portion 22 of the panel. This latter portion of the panel is provided with electrically conductive strips 57 and 58 for energizing the panel.

The tab portion 21 of the electroluminescent panel 20 is adapted to receive a folded identification card 59. The card illustratively comprises a simple 3×5 cardboard card of the type normally used in index files and includes suitable indicia such as the patient's name, address, physician, type of injury, hospital identification number, etc. The indicia may be placed on the card by a typewriter, printing device or other conventional apparatus for producing opaque characters to block the light from the electroluminescent panel.

Figure 8:
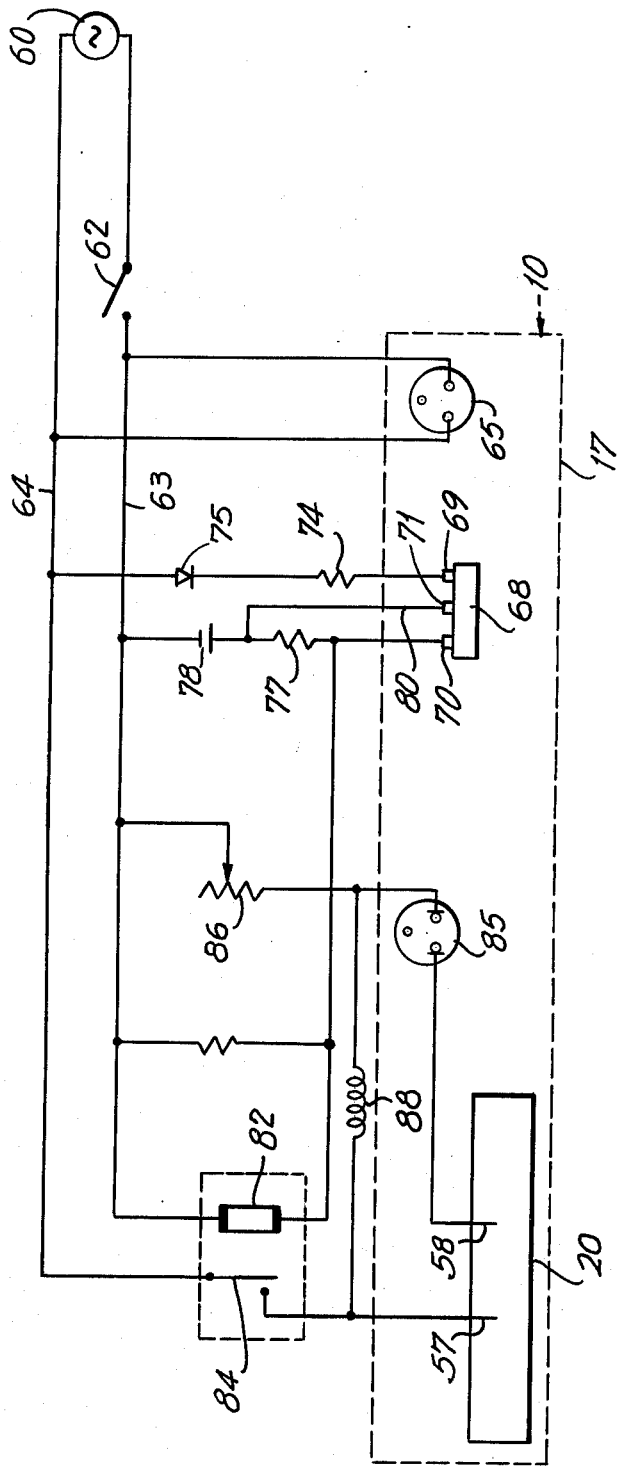
FIG. 8 is a schematic electrical diagram of the control circuit for the apparatus.

The electrical circuit for the apparatus is illustrated in FIG. 8. The circuit includes a conventional alternating current source 60 having one terminal connected through an on-off switch 62 to a lead 63 and the remaining terminal connected to a lead 64. An indicator light 65 is connected across the leads 63 and 64 and is mounted on the ledge 17 (FIG. 1) in position to be observed by the operator of the apparatus. Also connected across the leads 63 and 64 is a microswitch 68. The switch 68 is of the transfer type and includes outer terminals 69 and 70 and a transfer terminal 71. The terminal 69 is connected through a resistor 74 to a diode rectifier 75 and then to the lead 64, while the terminal 70 is connected through a resistor 77 and a condenser 78 to the lead 63. The transfer terminal 71 is connected by a lead 80 to the common terminal of the resistor 77 and the condenser 78.

The winding 82 of a normally open relay is connected between the switch terminal 70 and the lead 63. The winding 82 controls contacts 84 interposed between the lead 64 and the conductive strip 57 on the electroluminescent panel 20. The conductive strip 58 is connected through an indicator light 85 and a variable resistor 86 to the lead 63. In cases in which it is desired to provide a visual indication of the number of energizations of the panel 20, a counter 88 may be connected between the strip 57 and the common terminal of the light 85 and the resistor 86.

Figure 2:
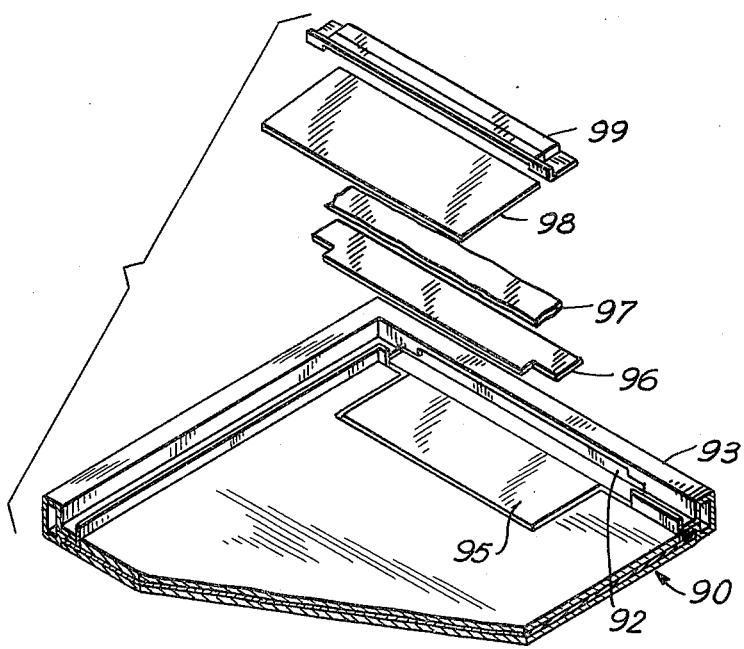
FIG. 2 is a fragmentary perspective exploded view of a portion of an x-ray cassette useful with the apparatus of FIG. 1.

A suitable x-ray cassette 90 with which the apparatus may be employed is illustrated in FIG. 2. The cassette 90 includes a slot-shaped opening 92 in one of the edges 93 of the cassette frame. A rectangular plate 95 of lead is affixed to the inner face of the cassette adjacent the opening 92, and this plate serves as a shield to prevent x-ray radiation from reaching the identification area of the film within the cassette. Supported immediately above the lead plate 95 is a guide plate 96 which defines the lower portion of the opening 92. The upper portion of the opening is formed by a felt strip 97 to thereby prevent unwanted light from entering the cassette. The strip is adhesively secured to a transparent plastic panel 98 which is held in position through the use of a generally channel-shaped cover 99.

Identifying information may be typed on the card 59 and applied to the film either prior or subsequent to the taking of an x-ray photograph in accordance with standard procedures at the particular hospital. In some cases, for example, the information is typed on the card at the time a patient is admitted to the hospital, and the card is removably inserted in a suitable window on the cover of the patient's file. As the patient enters the x-ray room preparatory to the taking of the x-ray, the card is removed from the window, and the information thereon is applied to the film.

To transfer the information on the card 59 to the x-ray film, the card is first slipped over the protruding tab portion 21 of the electroluminescent panel 20. In the embodiment illustrated in FIG. 1, for example, the portion 21 and the protecting slide member 40 may be manually pivoted about the pivot pins 47 and 48 (FIG. 4) to move the portion 21 to a convenient location for the insertion of the card, and the springs 55 and 56 thereupon automatically return the member 40 and the portion 21 to their horizontal positions in condition to receive a cassette. In other embodiments the card is inserted while the portion 21 and the member 40 remain in their horizontal positions. In either case, the two flaps of the card are respectively disposed in facing juxtaposition with the upper and lower surfaces of the portion 21.

One of the cassettes 90 containing x-ray film is then positioned on the flat surface 11 of the support member 10 with the slotted edge 93 of the cassette in facing juxtaposition with the abutment flange 16. An adjacent edge of the cassette bears against the upstanding flange 15 to facilitate the guiding of the cassette toward the electroluminescent panel 20 and its protecting slide member 40. As the cassette edge 93 engages the member 40, the member is urged in a rearward direction against the resilient bias of the springs 53 and 54. The member 40 is thereby moved away from protecting relationship with the protruding tab portion 21 such that only the tab portion 21 and the indicia bearing card 59 enter the cassette opening 92. The portion 21 and the card 59 are located within the cassette between the lead blocker plate 95 (FIG. 2) and the x-ray film.

The microswitch 68 normally is in position to complete a charging circuit for the condenser 78 (FIG. 8). This charging circuit extends from the lead 64 through the rectifier 75 and the resistor 74 to the terminal 69 of the microswitch and then from the terminal 71 to the conductor 80 leading to the condenser. As the cassette 90 continues its movement along the support member surface 11 and approaches the abutment flange 16, the cassette edge 93 contacts the microswitch 68 to break the circuit between the terminals 69 and 71 and to complete a discharge circuit between the terminals 70 and 71. The condenser 78 thereupon discharges through the relay winding 82 to energize the winding for a period of time, illustratively 0.1 seconds, determined by the desired exposure time of the film within the cassette. Energization of the winding 82 closes the relay contacts 84 to complete a circuit from the lead 64, the contacts 84, the conductive strips 57 and 58 on the electroluminescent panel 20, the indicator light 85 and the potentiometer 86 to the lead 63. The setting of the potentiometer 86 may be adjusted to control the exposure time in accordance with the film speed of the particular x-ray film within the cassette.

The electroluminescent panel 20 is energized upon the closing of the relay contacts 84 to illuminate the card 59 within the cassette opening 92 and thereby expose the film within the cassette with the information on the card. The closing of the contacts 84 simultaneously activates the indicator light 85 to provide a visual indication that an exposure is being made. The panel 20 is in close juxtaposition with the film within the cassette, being separated therefrom only by the card 59. The card itself is in face-to-face contact with the film, with the result that only an extremely short exposure time is needed to properly expose the film and provide a very clear and well defined legend thereon. When the discharge of the condenser 78 is completed, the relay contacts 84 open to automatically deenergize the panel 20 after a predetermined time interval.

When the exposure is completed, the indicator light 85 is deenergized simultaneously with the deenergization of the electroluminescent panel 20. The cassette 90 is then removed from its position on the support member 10, and the resilient biasing springs 53 and 54 automatically return the slide member 40 to its initial position in protecting relationship with the tab portion 21 of the electroluminescent panel 20.

In some advantageous embodiments of the invention the pivot springs 55 and 56 (FIG. 4) are not needed, and the slide member 40 is maintained in a horizontal plane at all times and is rigidly connected to the collars 50 and 51 by the pins 47 and 48. In these latter embodiments the electroluminescent panel need not include the hinge 23 but may be of integral one-piece construction as illustrated by the panel 100 shown in FIG. 7. The rear portion of the panel 100, that is, the right-hand portion as viewed in this figure, is clamped between the members 25 and 26, while the forward or tab portion is disposed within the slide member 40 and protrudes therefrom during the operation of the apparatus in the manner described heretofore. A pair of energizing leads 101 and 102 are attached to the panel 100 and are connected in the electrical circuit shown in FIG. 8.

Although the invention has been described and illustrated as having particular utility in the identification of x-ray film, it also may be advantageously employed to identify other types of photographic film. As an illustration, the invention may be used by photographers, etc., to identify the film within film packs and similar devices. Various other uses will suggest themselves to those skilled in the art upon a perusal of the foregoing disclosure.

The terms and expressions which have been employed are used as terms of description and not of limitation, and there is no intention in the use of such terms and expressions of excluding any equivalents of the features shown and described, or portions thereof, it being recognized that various modifications are possible within the scope of the invention claimed.

What is claimed is:

1. apparatus for placing identifying indicia on film within a cassette, the apparatus comprising, in combination:

a cassette supporting member for receiving a cassette;

illumination means carried by the supporting member and having a protruding portion in position to extend within an opening of a cassette received by said member;

indicia means disposed on the protruding portion of the illumination means and containing identifying information thereon;

an electrical circuit connected to the illumination means for energizing the same, to illuminate said illumination means and thereby expose the film within the cassette with the information on the indicia means; and slide means movably mounted on the cassette supporting member for protecting the protruding portion of the illumination means, the slide means being engaged by said cassette and being urged thereby away from protecting relationship with said protruding portion as the cassette is received by said supporting member, such that only the protruding portion and said indicia means extend within said cassette opening.

2. Apparatus for placing identifying indicia on film within a cassette having an opening therein, the apparatus comprising, in combination:
 a cassette supporting member for receiving a cassette;
 illumination means affixed to the supporting member, the illumination means having a protruding portion in position to extend within the opening of a cassette received by said member;
 indicia means disposed on the protruding portion of the illumination means and containing identifying information thereon;
 an electrical circuit connected to the illumination means for energizing the same, to illuminate said illumination means and thereby expose the film within the cassette with the information on the indicia means;
 slide means movably mounted on the cassette supporting member for protecting the protruding portion of the illumination means, the slide means being engaged by said cassette and being urged thereby away from protecting relationship with said protruding portion as the cassette is received by said supporting member, such that only the protruding portion and said indicia means extend within said cassette opening; and
 means for resiliently biasing the slide means into protecting relationship with said protruding portion.

3. Apparatus as defined in claim 2, which further comprises, in combination:
 means for pivotally connecting the protruding portion of the illumination means to the remaining portion thereof.

4. Apparatus for placing identifying indicia on x-ray film within a cassette having an opening adjacent one edge thereof, the apparatus comprising, in combination:
 a cassette supporting member for receiving a cassette;
 an illumination panel carried by the supporting member, the panel having a protruding tab portion in position to extend within the opening of a cassette received by said member;
 indicia means disposed on the protruding tab portion of the panel and containing identifying information thereon;
 electrical circuit means connected to the panel and automatically responsive to the receipt of a cassette by the supporting member for energizing said panel, to illuminate the same and thereby expose the film within the cassette with the information on the indicia means; and
 slide means movably mounted on the cassette supporting member adjacent at least one surface of the panel for protecting the same, the slide means being engaged by said one cassette edge and being urged thereby away from protecting relationship with said one surface as the cassette is received by said supporting member, such that only the tab portion of said panel and said indicia means extend within said cassette opening.

5. Apparatus for placing identifying indicia on x-ray film within a cassette having an opening adjacent one edge thereof, the apparatus comprising, in combination:
 a cassette supporting member for receiving a cassette;
 illumination means carried by the supporting member, the illumination means having a protruding tab portion in position to extend within the opening of a cassette received by said member;
 indicia means disposed on the protruding tab portion of the illumination means and containing identifying information thereon;
 an electrical circuit connected to the illumination means and automatically responsive to the receipt of a cassette by the supporting member for energizing said illumination means, to illuminate the same and thereby expose the film within the cassette with the information on the indicia means;
 slide means movably mounted on the cassette supporting member for protecting the protruding tab portion of the illumination means, the slide means being engaged by said one cassette edge and being urged thereby away from protecting relationship with the protruding tab portion as the cassette is received by said supporting member, such that only the tab portion and said indicia means extend within said cassette opening; and
 means mounting the slide means for pivotal movement relative to the cassette supporting member.

6. Apparatus for placing identifying indicia on x-ray film within a cassette having a slotted opening adjacent one edge thereof, the apparatus comprising, in combination:
 a cassette supporting member having a substantially flat surface for receiving a cassette;
 an electroluminescent panel carried by the supporting member, the panel having a protruding tab portion in position to extend within the opening of a cassette received by said member;
 indicia means disposed on the protruding tab portion of the electroluminescent panel and containing identifying information thereon;
 electrical circuit means connected to the electroluminescent panel and responsive to the receipt of a cassette by said surface of the supporting member for energizing said panel, to illuminate the same and thereby expose the film within the cassette with the information on the indicia means; and
 slide means movably mounted on the cassette supporting member adjacent at least one surface of the electroluminescent panel for protecting the tab portion, the slide means being engaged by said one cassette edge and being urged thereby away from protecting relationship with the tab portion as the cassette is received by said supporting member, such that only the tab portion and said indicia means extend within said cassette opening.

7. Apparatus as defined in claim 6, in which the slide means is mounted on the cassette supporting member for both sliding and pivotal movement relative thereto.

8. Apparatus as defined in claim 7 which further comprises, in combination:
 first spring means for resiliently biasing the slide means into protecting relationship with the tab portion of said panel; and second spring means for resiliently biasing the slide means into coplanar relationship with said surface of the supporting member.

9. Apparatus for placing identifying indicia on x-ray film within a cassette having a slotted opening adjacent one edge thereof, the apparatus comprising, in combination:

a cassette supporting member for receiving a cassette;

illumination means affixed in a stationary position on the supporting member, the illumination means having a protruding tab portion in position to extend within the opening of a cassette received by said member;

indicia means removably disposed on the protruding tab portion of the illumination means and containing identifying information thereon;

an electrical circuit connected to the illumination means and automatically responsive to the receipt of a cassette by the supporting member for energizing said illumination means, to illuminate the same and thereby expose the film within the cassette with the information on the indicia means;

means connected to the electrical circuit for automatically de-engaging the illumination means after a predetermined time interval; and slide means movably mounted on the cassette supporting member adjacent the illumination means for protecting the same, the slide means being engaged by said one cassette edge and beind urged therby away from protecting relationship with said illumination means as the cassette is received by said supporting member, such that only the tab portion of said illumination means and said indicia means extend within said cassette opening.

10. Apparatus for placing identifying indicia on x-ray film within a cassette having a slotted opening adjacent one edge thereof, the apparatus comprising, in combination:

a cassette supporting member including edge guide means for receiving a cassette;

an electroluminescent panel carried by the supporting member, the panel having a protruding tab portion in position to extend within the opening of a cassette received by said member and a remaining portion affixed in a stationary position on said member;

indicia means removably disposed on the protruding tab portion of the electroluminescent panel and containing identifying information thereon;

electrical circuit means connected to the electroluminescent panel and automatically responsive to the receipt of a cassette by the supporting member for energizing said panel, to illuminate the same and thereby expose the film within the cassette with the information on the indicia means;

means connected to the circuit means for automatically de-energizing the electroluminescent panel after a predetermined time interval; and slide means movably mounted on the cassette supporting member adjacent the opposite surfaces of the electroluminescent panel for protecting the same, the slide means being engaged by said one cassette edge and being urged thereby away from protecting relationship with the surfaces of said panel as the cassette is received by said supporting member, such that only the tab portion of said panel and said indicia means extend within said cassette opening.

11. Apparatus for placing identifying indicia on x-ray film within a cassette having a slotted opening adjacent one edge thereof, the apparatus comprising, in combination:

a cassette supporting member including edge guide means for receiving a cassette;

an electroluminescent panel affixed in a stationary position on the supporting member, the panel having a protruding tab portion in position to extend within the opening of a cassette received by said member;

indicia means removably disposed on the protruding tab portion of the electroluminescent panel and containing identifying information thereon;

electrical circuit means connected to the electroluminescent panel and automatically responsive to the receipt of a cassette by the supporting member for energizing said panel, to illuminate the same and thereby expose the film within the cassette with the information on the indicia means;

means connected to the circuit means for automatically de-energizing the electroluminescent panel after a predetermined time interval;

slide means movably mounted on the cassette supporting member adjacent the opposite surfaces of the electroluminescent panel for protecting said tab portion, the slide means being engaged by said one cassette edge and being urged thereby away from protecting relationship with said tab portion as the cassette is received by said supporting member, such that only the tab portion and said indicia means extend within said cassette opening; and means for resiliently biasing the slide means into protecting relationship with said tab portion.

12. Apparatus as defined in claim 11, in which the cassette supporting member includes a substantially flat surface, the slide means being reciprocably movable in a direction parallel to said surface.

* * * * *